United States Patent [19] [11] 4,245,783
Richter [45] Jan. 20, 1981

[54] CONDENSATION STEAM TRAP COMPRISING A PLATE-LIKE BIMETAL BODY HAVING A CURVED STAPE

[76] Inventor: Hans Richter, Reinthalerstrasse 6, 2800 Bremen 1, Fed. Rep. of Germany

[21] Appl. No.: 36,298
[22] Filed: May 7, 1979
[30] Foreign Application Priority Data
  May 22, 1978 [DE] Fed. Rep. of Germany ....... 2822351
[51] Int. Cl.$^3$ .............................................. F16T 1/08
[52] U.S. Cl. .................................. 236/59; 73/861.79; 165/11 R; 236/93 R; 236/101 E; 251/84
[58] Field of Search .................. 236/59, 93 R, 101 D, 236/101 E; 251/84, 11, 86; 165/11; 73/229

[56] References Cited
U.S. PATENT DOCUMENTS

| | | | |
|---|---|---|---|
| 1,308,856 | 7/1919 | Morgan | 236/59 X |
| 1,310,026 | 7/1919 | Lippert | 236/59 |
| 1,848,632 | 3/1932 | Jensen | 251/86 |
| 2,455,305 | 11/1948 | Heva | 236/59 |
| 3,447,748 | 6/1969 | Saronni | 236/59 |
| 3,867,840 | 2/1975 | Baatz | 73/229 |
| 4,037,784 | 7/1977 | Sabarly | 236/56 |
| 4,140,013 | 2/1979 | Hunger | 73/229 |

*Primary Examiner*—William E. Wayner
*Assistant Examiner*—William E. Tapolcai, Jr.
*Attorney, Agent, or Firm*—Gust, Irish, Jeffers & Hoffman

[57] ABSTRACT

The condensation steam trap device includes a housing having a passage through the wall, which provides for fluid flow between the interior and exterior of the housing. The passage has a valve seat and carries a valve for engagement with the seat. A valve-actuating, temperature-sensitive element is disposed within the housing and has a connection with the valve for controlling the opening and closing thereof in response to changes in temperature of the element. The element is a bimetallic band or strip of curved or part-cylindrical shape. A nozzle or inlet pipe projects through another portion of the housing wall as well as through a clearance opening in the strip, the axis of the pipe and the discharge end thereof being directed against the inner surface of the strip substantially tagentially thereof. Condensate flowing through such pipe thus impinges a substantial area of the curved bimetallic strip causing the latter to move in response to a temperature change to a greater extent than would be true by directing such flow radially against the exterior of the strip. Upon actuation of the strip in response to temperature changes the valve in the aforesaid passage is also moved thereby controlling the degree of opening and closing thereof.

8 Claims, 5 Drawing Figures

CONDENSATION STEAM TRAP COMPRISING A PLATE-LIKE BIMETAL BODY HAVING A CURVED STAPE

BACKGROUND OF THE INVENTION

1. Field of the Invention

The present invention relates to condensation steam traps and more particularly to a trap which includes a bimetallic element of part cylindrical shape for controlling the opening and closing of a valve, condensate being directed onto the internally curved surface of the bimetallic element to change its temperature and to cause movement thereof.

2. Description of the Prior Art

In prior art condensation steam traps, there is used a relatively thick walled, three-quarter, part-cylindrical bimetallic element or strip which consists of two layers of fine steel homogeneously welded together in such a manner as to provide for a relatively long stroke of a valve member connected to one end thereof. In this known design, condensate is directed radially onto the exterior of the curved bimetallic strip such that the area of the strip directly exposed to the flow of the condensate is relatively small. Movement of the strip thereof is correspondingly small. The present invention is intended to increase the reaction velocity or movement of the curved bimetallic strip as well as to provide for the measurement of condensate flow.

SUMMARY OF THE INVENTION

The invention relates to a condensation steam trap device comprising a housing within which a part-cylindrical bimetallic body is mounted in spaced relation. Mounted in the wall of the housing is a valve body having a passage which provides for fluid communication between the interior and exterior of the housing, a valve seat being provided in the passage. A valve is movably disposed within such passage for selective opening and closing engagement with the valve seat thereby controlling the flow of fluid between the interior and exterior of the housing. One end of the bimetallic body is secured to the valve body with the opposite end being disposed opposite the passage and connected to the valve for controlling movement of the valve with respect to the valve seat.

In this invention, the bimetallic strip has an elongated slot extending longitudinally in the direction of movement of the valve member. A condensate inlet pipe passes through and is secured to the housing wall and extends through the slot to direct condensate onto the inner wall of the curved bimetallic strip. The transmission of heat from the condensate flowing onto the bimetallic strip is thus maximized thereby increasing the reaction velocity of the strip as well. The flow of the condensate along the inner wall of the curved bimetallic strip moreover flushes any foreign matter contained in the condensate laterally therefrom.

The closure member or valve is loosely connected to a narrowed portion of the elongated slot which corresponds to a cross bar. This narrowed portion is located as closely as possible to the freely movable end of the bimetallic strip with the width thereof being sufficiently small to restrict transverse movement of the closure member or valve connected thereto.

The condensate inlet pipe is set at an acute angle to an elongated socket formed in the housing wall, this socket being adapted to be connected to an external section of pipe.

A particularly useful modification of this invention includes a measuring device eccentrically positioned within the curved bimetallic strip for rotation, the periphery of the measuring device being disposed immediately adjacent to the inner wall of the bimetallic strip in the area directly impinged by the condensate conducted by the inlet pipe, the measuring device including an impeller rotatable about a shaft mounted on a bracket secured to the bimetallic strip. The impeller includes angularly spaced radiating blades.

The housing may be provided with a glass window opposite the region of the flow of condensate onto the bimetallic strip, an optical or magnetic counting device being located in registry with the window for counting the number of revolutions of the impeller. In one embodiment, the edges of the impeller blades can be distinctively colored with respect to the remaining impeller portions for providing light pulses as the impeller rotates. In another arrangement, a non-magnetic disc may be mounted on one end of the impeller, this disc being provided with a segment of magnetic material which, upon rotation with the impeller, results in producing magnetic pulses which can be counted by the externally mounted counter.

It is an object of this invention to provide a condensation steam trap having a condensate-sensing element of bimetallic material which more readily responds to impinging condensate.

It is another object to provide in such a steam trap a device for measuring the flow of condensate.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
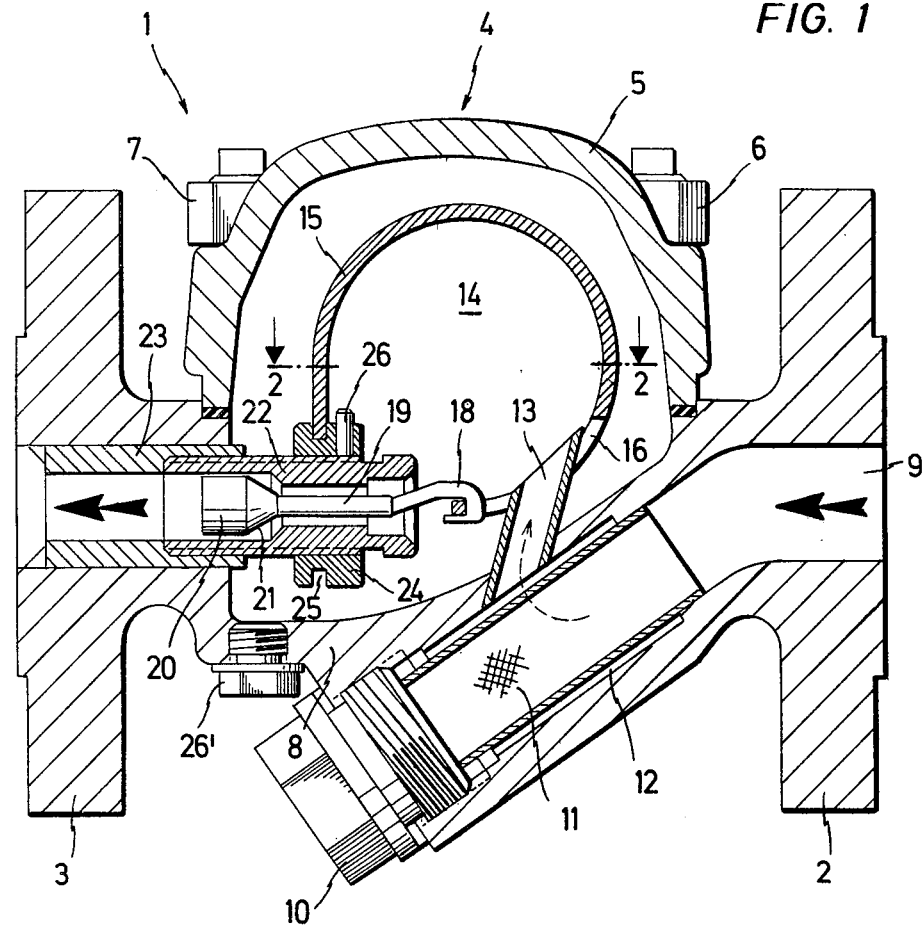
FIG. 1 is a longitudinal section of one embodiment of the invention.

Referring to FIG. 1 of the drawings, the condensation steam trap 1 there shown is insertable via pipe flanges 2 and 3 into a pipe system, this trap 1 having a housing 4 in the form of a cover 5 secured to the lower part 8 by means of screws or bolts 6 and 7.

An elongated condensate passage or socket 9 through the flange 2 extends angularly into the lower part 8 of the housing and is sealed at the end by means of a threaded plug 10 which may be removed for cleaning the passage 9.

The passage 9 is provided with a cylindrical enlargement 12 from which a nozzle or inlet pipe 13 extends at approximately an angle of 45°, the pipe 13 being secured to and extending through the housing part 8. The end of the pipe 13 is located within the space 14 inside the curved bimetallic band 15 having extended area inner and outer circumferential surfaces, which in FIG. 1 is shown as being part cylindrical to an extent of about 270°. This bimetallic band 15 may have a shape other than circular and furthermore may correspond to a semicircle. It is possible for the shape to be that of a complete circle.

Figure 2:
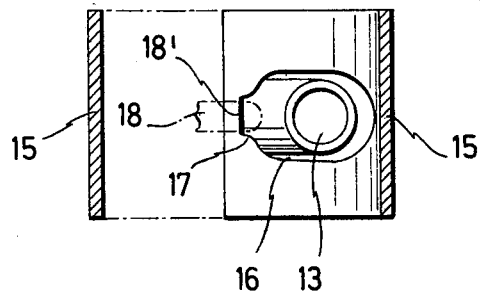
FIG. 2 is a section taken substantially along section line 2—2 of FIG. 1.

As particularly shown in FIG. 2, the band 15 is provided with an elongated slot 16 having a chamfered upper edge and a narrowed portion 17 closed by a crossbar 18′. The valve 20 is connected to this cross bar 18′ as will be explained more fully later on.

With changes in temperature, the bimetallic band 15 will move, such that the valve end thereof will move generally toward and away from the valve body 22. For this reason, the slot 16 is made somewhat wider than the inlet pipe 13 which is set at an oblique angle. The slot 16 extends in the direction of motion of the band 15 and more particularly the valve end thereof. The clearance between the edges of the slot 16 and the pipe 13 must be large enough to avoid any interference with strip movement which might result from temperature changes during movements of the band 15. The narrowed portion 17 is slightly wider than a hook 18 on the end of the shank 19 extending from a valve or plug 20, the latter having a tapered transition surface 21 for engagement with the illustrated valve seat having a complementary taper. A valve body 22 is threaded into a tubular socket 23 secured within the pipe flange 3, this assembly 22, 23 passing through the wall of the housing 4 as shown. The valve 20 is mounted for movement within the passage shown in the valve body 22.

A mounting element 24 is threaded onto the valve body 22, this mounting element 24 being provided with an annular groove 25 in which the end of the bimetallic band 15 is rigidly secured. This mounting element 24 is secured against rotation to the valve body 22 by means of a pin 26.

Although the disclosed arrangement of the enlongated slot 16 and inlet pipe 13 adjacent to the movable end of the band 15 has proven to be particularly effective, it is to be understood that the pipe 13 can pass through the bimetallic band 15 at a different location. The disclosed arrangement, however, provides the advantage that about the full length of the curved bimetallic band 15 can be subjected to the flow of condensate from the pipe 13 to obtain more effective temperature change and movement of the bimetallic band 15. As shown in FIG. 1, the inlet pipe 13 is of relatively large cross-section so that the formation of expanding steam as a result of a drop in pressure is avoided in this pipe 13.

The axis of the pipe 13 extends such that the condensate flowing therefrom is tangentially directed to impinge on the bimetallic band 15 within space 14 along the inner side of the band 15 so that the area upon which the condensate impinges is as large as possible.

A plug 26′ is provided within the bottom portion 8 for emptying or cleaning the housing 4.

Condensate flows from the inlet pipe 13 along the inner surface of the bimetallic band 15 and out of the housing 4 via the passage in the valve body 22. Pressure within the housing 4 bears against the valve 20 in a direction to open it, this opening movement being against the spring force of the bimetallic band 15. The band 15 furthermore can exert a force moving the valve 20 toward the right to its seated or closed position. The lost motion connection of the hook 18 with the cross bar 18′ permits back pressure within the tubular portion 23 to close the valve 20 onto its seat, the hook 18 being capable of moving relative to the crossbar 18′.

Figure 3:
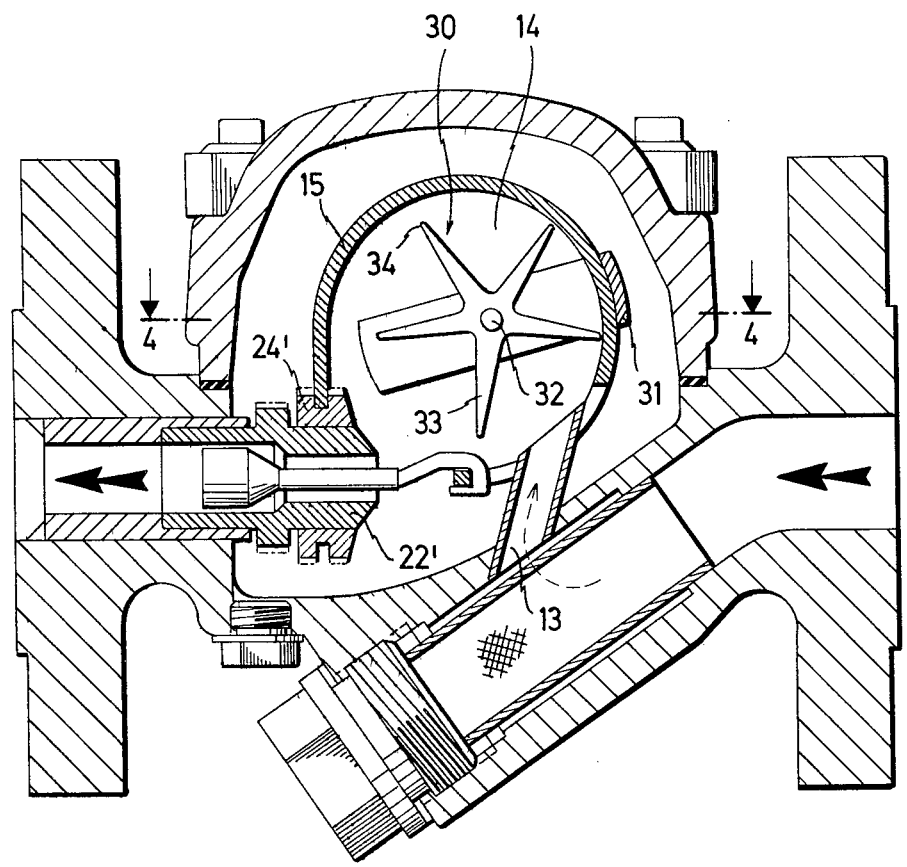
FIG. 3 is a longitudinal section of another embodiment of this invention.
Figure 5:
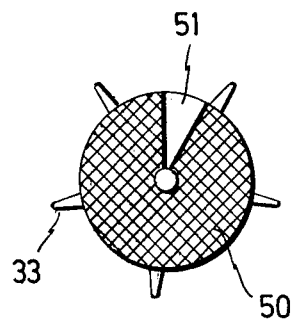
FIG. 5 is an end view of one embodiment of the impeller used in the arrangement of FIG. 3.

Referring now to FIG. 3, the alternative embodiment there shown is of essentially the same construction as that of FIG. 1 with the exception that a condensate flow measuring device 30 is mounted on a U-shaped bracket 31 which embraces and is secured to the bimetallic band 15. A shaft 32 connected to the two legs of the bracket 31 permits free rotation of the measuring device or impeller 30 having blades 33. The inner portion of the valve seat body 22′ and of the element 24′ are curved as shown to correspond to the impeller periphery. As shown in FIG. 3, the shaft 32 is eccentrically positioned with respect to the center of the part-cylindrical band 15, the radially outer edges 34 of the blade 33 upon rotation defining a cylinder which is disposed adjacent to the inner wall of the bimetallic strip 15 in the area of the bracket 31. This area is in the path of the flow directed from the inlet pipe 13. The condensate inpinging on the inner surface of the bimetallic band 15 also impinges the blades 33 causing the impeller 30 to rotate.

Since the bracket 31 is mounted on the bimetallic band 15, the impeller 30 moves with the bimetallic band 15 as its temperature changes. The distal ends of the legs of the bracket 31 extend beyond the blades 33, the bracket 31 being so narrow that foreign matter in the form of fine dirt can flow therearound.

Figure 4:
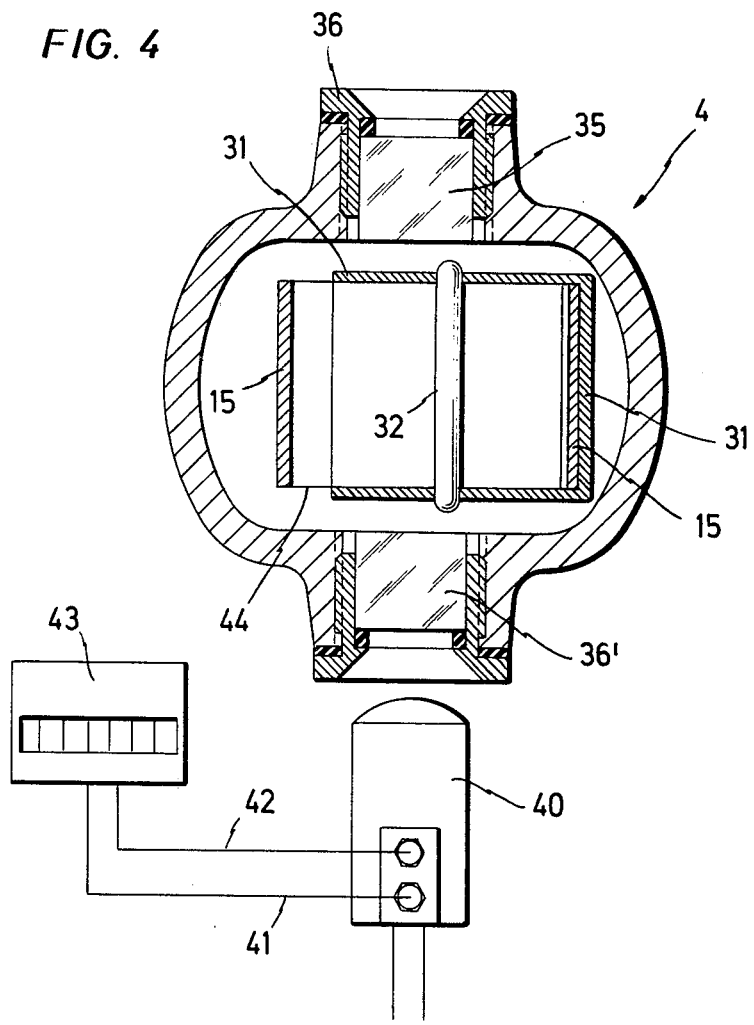
FIG. 4 is a cross section taken substantially along section line 4—4 of FIG. 3.

Further as can be shown in FIG. 4, the bimetallic band 15 is spaced from the wall of the housing 4 sufficiently that the condensate can flush or wash away any foreign matter, for example fine dirt, that might collect on the bimetallic band 15.

In the embodiment shown in FIG. 4, there is provided on opposite sides of the housing 4 inspection windows 35 and 36′ made of glass which is chemically and temperature resistant. These windows 35 and 36′ are secured to the housing by means of sockets 36 threaded onto the housing as shown. Disposed opposite the window 36′ is an optoelectronic light sensor 40 having electrical lines 41 and 42 connected to an electronic counter 43.

As has already been discussed in connection with the embodiment of FIG. 3, the edge 44 of one blade 33 or alternatively the edges of all of the blades 33, which edges are juxtaposed with respect to the window 36′, are brightly colored in contrast with other surfaces of the impeller 30 so that rotation of the impeller results in producing light pulses which are sensed by the sensor 40 and counted by the counter 43.

Alternatively, the blades 33 on the edges juxtaposed with the window 36′ are covered by means of a disc 50 having the surface which faces the window 36′ being of a non-magnetic material. One portion of the disc 50, in the illustrated case a sector 51, consists of magnetic material. Rotation of the impeller 30 results in rotation of the disc 50 which in turn produces magnetic pulses sensed by the sensor 40 which are counted by the counter 43.

The relatively large size of the inlet pipe 13, as mentioned previously, not only prevents re-evaporation but also minimizes the velocity of flow of the condensate. The impeller 30, and more specifically the blades 33, are thereby caused to rotate at a correspondingly low speed. The counter 43 may include an electronic reducer for dividing the pulses acting on the counter 43 to a ratio of, for example, one in one hundred so that counting may be conducted over a relatively long period of time.

While there have been described above the principles of this invention in connection with specific apparatus, it is to be clearly understood that this description is made only by way of example and not as a limitation to the scope of the invention.

What is claimed is:

1. For use in a condensation steam trap having a housing, a passage through the wall of the housing, a valve movably disposed within said passage and engagable with a valve seat therein for controlling the opening and closing of said passage; a temperature-sensitive, valve-activating device disposed within said housing, said device being in the form of a curved bimetallic band having inner and outer extended area circumferential surfaces, one end of said band being rigidly secured within said housing, the other end being movable relative to said housing, the other end portion of said band having a clearance opening therein, means for moving said valve toward said valve seat in response to movement of said other band end including a lost motion connection and a condensate inlet pipe passing through the wall of and extending into said housing and having its inner end directed through said clearance opening and tangentially toward the inner circumferential surface of said band.

2. The device of claim 1 wherein said lost motion connection includes said clearance opening in the movable end portion of said band which defines a cross bar, and a hook-shaped element on said valve slidably engaged with said cross bar.

3. The device of claim 2 wherein said housing has an elongated socket in the wall thereof and extending tangentially to said curved band, said inlet pipe being arranged at an acute angle with respect to the axis of said socket.

4. The device of claim 3 including a rotatable measuring device carried by said band eccentrically thereof, said band being of part-cylindrical shape, a peripheral portion of said measuring device being juxtaposed with respect to the inner end of said inlet pipe.

5. The device of claim 4 wherein said measuring device is in the form of an impeller having a plurality of angularly spaced, radially arranged blades, said impeller being rotatably mounted on a bracket carried by said band.

6. The device of claim 5 including a window in said housing in juxtaposed relation to said impeller, and a sensor disposed opposite said window for counting the revolutions of said impeller.

7. The device of claim 6 wherein the edges of one or more of said blades opposite said window are of a color different than the remaining portions of said blades.

8. The device of claim 6 wherein the end of said impeller opposite said window carries a segment of magnetic material, said sensor being responsive to the rotation of said segment to count the revolutions of said impeller.

* * * * *